(12) United States Patent
Ye

(10) Patent No.: US 10,232,557 B2
(45) Date of Patent: Mar. 19, 2019

(54) HEATING APPARATUS FOR AIR CUSHION MACHINE

(71) Applicant: Huizhou Willing Office Supplies Co., Ltd., Huizhou (CN)

(72) Inventor: Jingnong Ye, Huizhou (CN)

(73) Assignee: HUIZHOU WILLING OFFICE SUPPLIES CO., LTD., Huizhou, Guangdong (CN)

( * ) Notice: Subject to any disclaimer, the term of this patent is extended or adjusted under 35 U.S.C. 154(b) by 583 days.

(21) Appl. No.: 15/007,223

(22) Filed: Jan. 27, 2016

(65) Prior Publication Data

US 2017/0210056 A1    Jul. 27, 2017

(51) Int. Cl.
| | |
|---|---|
| *B29C 65/02* | (2006.01) |
| *B29C 65/18* | (2006.01) |
| *B29C 65/30* | (2006.01) |
| *B29C 65/78* | (2006.01) |
| *B29C 65/00* | (2006.01) |
| *B31D 5/00* | (2017.01) |
| *B29L 31/00* | (2006.01) |

(52) U.S. Cl.
CPC ............ *B29C 65/18* (2013.01); *B29C 65/305* (2013.01); *B29C 65/7891* (2013.01); *B29C 66/1122* (2013.01); *B29C 66/439* (2013.01); *B29C 66/8122* (2013.01); *B29C 66/81457* (2013.01); *B29C 66/83413* (2013.01); *B31D 5/0073* (2013.01); *B29L 2031/7138* (2013.01)

(58) Field of Classification Search
CPC ...... B29C 65/18; B29C 65/305; B29C 66/439
See application file for complete search history.

(56) References Cited

U.S. PATENT DOCUMENTS

| | | | | | |
|---|---|---|---|---|---|
| 2,579,063 | A | * | 12/1951 | Andrews | ................. B29C 65/14 156/583.3 |
| 4,213,031 | A | * | 7/1980 | Farber | ..................... B29C 65/18 156/582 |
| 4,253,007 | A | * | 2/1981 | Dannatt | ............. G03G 15/2053 219/216 |
| 4,628,183 | A | * | 12/1986 | Satomura | ........... G03G 15/2053 219/216 |
| 2012/0048470 | A1 | * | 3/2012 | Fujishima | ........... B32B 37/0053 156/359 |

\* cited by examiner

*Primary Examiner* — Philip C Tucker
*Assistant Examiner* — John Blades
(74) *Attorney, Agent, or Firm* — Leong C. Lei

(57) ABSTRACT

A heating apparatus for an air cushion machine includes a hot sealing wheel, wherein a transmission wheel is respectively configured on two sides of the hot sealing wheel, an electrode plate is configured on an outer side of each transmission wheel, a guide cylinder seat is configured between the transmission wheel and hot sealing wheel, fixing guide cylinders are projected from the guide cylinder seat, the fixing guide cylinders are passed through the transmission wheel to be in electric contact with the electrode plate, heating sheets are configured inside the hot sealing wheel, each surface of the heating sheet is in electric connection with a conductive spring, another end of the conductive spring is configured with a carbon brush in rotational contact with the electrode plate, and the conductive spring and carbon brush are configured inside the fixing guide cylinder, thereby achieving high energy utilization, good temperature uniformity.

17 Claims, 4 Drawing Sheets

HEATING APPARATUS FOR AIR CUSHION MACHINE

TECHNICAL FIELD OF THE INVENTION

The present invention relates to an air cushion machine, and more particularly to a heating apparatus for an air cushion machine.

DESCRIPTION OF THE PRIOR ART

In many fields such as logistics, online shopping, medicine, chemical industry, scientific research, electronics, etc, traditional foam, bubble grain, paper, or etc is widely adopted for the filling in packing of goods; it is not only very complex in operation, occupying large space, time and labor consumption, not conforming to environmental protection, but not good in effect. Currently, air cushions are adopted popularly for packing and transportation; they are time and labor consumptive as well as conforming to environmental protection, not occupying space, and good for the protection effect of goods such that they can be widely applied.

In conventional air cushion machine, some use two layers of separate plastic films to make air cushions through thermal fusion, and others a premade double-layer plastic film as a raw material depending on the difference of hot sealing. Whether two layers of separate plastic films or a premade double-layer plastic film is used, both need to be heated to from sealed air cushions after air filling. In the current air cushion machines, most heat a conveyor to realize the conveyance and hot sealing of a plastic film, namely, the plastic film is sandwiched between the two moving endless conveyors, and moved forward thereby. At the same time, a heating apparatus heats the conveyor to seal the plastic film. The method has the following defects: 1. the flexible conveyor is subjected to force and heat, easy to be damaged upon conveyance, and therefore, the life thereof is not long; 2. because the heating apparatus heats the plastic film via the conveyor, the heat transfer efficiency is low, the heating speed is slow such that the conveyance speed of the plastic film cannot be too fast, and the productivity is thus affected.

In addition, there are also a few air cushion machines equipped with a hot sealing wheel adapted to heat a plastic film in a direct contact way. But, because the hot sealing wheel is static, sliding friction will be generated between the plastic film and the static hot-sealing wheel during the moving of the plastic film, causing the plastic film to be stuck to the hot-sealing wheel, and the hot sealing quality is thus affected. In addition, the moving speed of the plastic film cannot be too fast.

To solve the problems mentioned above, Chinese Patent Application No. 201520535294.8 discloses a hot sealing apparatus for an air cushion machine, including a hot-sealing wheel, which is a circular disk body and fixed to a first transmission shaft, which is further fixed with two transmission wheels, where the hot-sealing wheel is rotated together with the two first transmission wheels and positioned between them, with the hot-sealing wheel having the same diameter as each first transmission. Sliding friction and thermal adhesion are not easy to be generated by hot-sealing plastic films through the hot sealing wheel, capable of improving the hot sealing quality substantially. Increasing the sealing speed greatly, and thus enhancing the production efficiency. But, this hot sealing apparatus has the follow problems while putting into practical use:

1. from the point of view of heating, the electric heating means used as a heating source include an electric heating element and two heat transfer plates, one end of each of which is in electric with the electric heating element, and other ends of which respectively clip the two sides of the heating piece adapt to hot-seal an air filled film roll, where the heating piece is made of a copper sheet; the heat generated from the electric heating element will be transmitted to the copper sheet through the heat transfer plate, and the copper sheet is an exposed circular disc body such that the heat will be washed away directly through the copper sheet, resulting in low energy utilization, large temperature fluctuation and great influence by environment, and ultimately, affecting directly the quality consistence of the air filled film roll after hot sealing; and 2. from the point of view of the conveyance of the air filled film roll, a specific hot sealing process is realized by a rotating heating piece and static second transmission shaft; the air filled film roll is hot-sealed by means of unidirectional heat transfer in the process of hot sealing such that the stability of the bonding force on both sides of the film roll will be greatly reduced after hot sealing, thus directly restricting the further improvement of production efficiency.

SUMMARY OF THE INVENTION

An object of the present invention is to provide a heating apparatus for an air cushion machine, being high in energy utilization, uniform in temperature, small in temperature fluctuation due to environment, stable in hot sealing and low in cost.

To achieve the object mentioned above, the present invention proposes a heating apparatus for an air cushion machine, including a hot sealing wheel, wherein a transmission wheel is respectively configured on two sides of the hot sealing wheel; an electrode plate is configured on an outer side of each transmission wheel; a guide cylinder seat is configured between the transmission wheel and hot sealing wheel; fixing guide cylinders are projected from the guide cylinder sea; the fixing guide cylinders are passed through the transmission wheel to be in electric contact with the electrode plate; heating sheets are configured inside the hot sealing wheel; each surface of the heating sheet is in electric connection with a conductive spring; another end of the conductive spring is configured with a carbon brush in rotational contact with the electrode plate; and the conductive spring and carbon brush are configured inside the fixing guide cylinder. Heat is transmitted outward gradually from the inside of the hot sealing wheel by configuring the heating sheets inside the hot sealing wheel, preventing heating sheets from being exposed directly, and thus decreasing heat exchange with the external environment, which not only can improve the energy utilization effectively, but ensure that the temperature of the outside circumferential surface is uniform, and even more overcome the problem of the large temperature fluctuation of the heating sheet due to environmental influence. In the structure design, the configuration of the carbon brush on the end of the conductive spring is adopted: the conductive spring is heated to extend while the heating sheets is heated to cause the carbon brushes to be in electric communication with the electrode plate to rotate the transmission wheel so as to drive the hot sealing wheel to cause the air-filled film roll to be in contact with the rotating hot sealing wheel to achieve the hot sealing in such a way that the sliding friction and heat adhesion is less likely to occur, thereby improving the hot sealing stability effectively. In addition, all the components of the heating apparatus are combined into a whole by engagement, simplifying the structure design in the premise of ensuring the heat transfer effect, and improving the quickness of the assembly and forming and the convenience of daily maintenance and treatment.

Furthermore, the circumferential surface of the hot sealing wheel is covered with a layer of silicone, which has a feature of good heat stability, capable of guaranteeing fully the insulation effect during heat transmitted from the heating sheet to the hot sealing wheel and then to the outside, and improving the temperature uniformity of the hot seating wheel in contact with the film roll through the heat transfer of the silicone layer and the consistency of the hot sealing quality of the film. In addition, because the texture of the silicone layer is moderate in hardness such that the hot sealing wheel is not so hard to wear and tear the film roll and is not so soft to generate too low a hot sealing to affect the hot sealing tightness at the place of the film in roll contact with the hot sealing wheel during the hot sealing.

Furthermore, the hot sealing wheel covered with the silicone layer and the transmission wheel covered with the silicone layer are equal in diameter, ensuring effectively that the consistency of the hot sealing wheel, transmission wheel in contact with the film, and thus ensuring the hot sealing tightness of the film after hot sealing.

Furthermore, the hot sealing sheet is an annular body. Heat is transmitted from the outer side of the annular heating sheet to the silicone layer covered on the outer side of the hot sealing wheel and at the same time, the hollow cavity inside of the annular heating sheet is also a heat exchange passage for heat transfer by configuring the annular wheel inside the hot sealing wheel, ensuring the temperature uniformity of the hot sealing wheel.

Furthermore, the heating sheet is a PTC heating sheet. The PTC heating sheet is used as an electrothermal ceramic material, having the effects of long use, quick temperature compensation and good temperature constancy without needing the configuration of a special temperature controlling element and capable of preventing the hot sealing quality of the film roll from being worsen after heating due to temperature fluctuation, thereby improving the consistency of the hot sealing tightness, extending the life of the heating apparatus, and decreasing the use cost.

Furthermore, the electrode plate is configured on the outer side of the transmission wheel through an electrode plate fixing bracket; the electrode plate fixing bracket is configured on the outer side of the electrode plate; the electrode plate fixing bracket includes two fixing projecting cylinders respectively passed through the electrode plate, transmission wheel and hot sealing wheel to engage with them actively into one body, not only ensuring the contact tightness between the hot sealing wheel, transmission wheel and electrode plate, and simplifying the tedious assembly.

Furthermore, the fixing guide cylinders number two; the two fixing guide cylinders are projected symmetrically from the outer side of the guide cylinder seat. The conducing circuit of the electrode plate can be realized through the symmetrical configuration of the fixing guide cylinders to conduct the heating sheet in a heating state to cause the transmission wheel to rotate, and further to drive the hot sealing wheel to rotate therewith simultaneously, realizing the roll contact of the hot sealing wheel, transmission wheel with the film, thereby improving the production efficiency. In addition, the rolling contact prevents the film from being worn and torn by the heating apparatus during hot sealing.

Furthermore, fixing guide cylinder through holes and fixing projecting cylinder through holes are configured on the transmission wheel, where the fixing guide cylinder through holes and fixing projecting cylinder though holes are staggered symmetrically, simplifying the structure of the heating apparatus, and being convenient for the heating apparatus to be assembled.

Furthermore, the heating apparatus is configured on the air cushion machine through a rotating shaft, where the rotating shaft is passed through the centers of the electrode plate fixing brackets, electrode plates, transmission wheels and hot sealing wheel, ensuring the rotating concentricity of the heating apparatus, and thus improving the operation stability of the heating apparatus.

Furthermore, the heating apparatuses configured on the air cushion machine number two; the two heating apparatuses are opposed to each other. In the process of the practical hot sealing, the two heating apparatuses are rotated in opposite directions, hot-sealing the two sides of the film roll simultaneously, not only improving the hot sealing tightness of the film, and increasing the hot sealing quality thereof, but speeding up the hot sealing thereof, and thus improving the production efficiency.

The heating apparatus for an air cushion machine according to the present invention has the following advantages:

1. the energy utilization is high; heat is transmitted outward gradually from the inside of the hot sealing wheel by configuring the heating sheet inside the hot sealing wheel, preventing the heating sheet from being exposed directly, decreasing the heat exchange with the outside environment, and thus improving the energy utilization effectively;

2. the temperature uniformity is good; heat is transmitted outward gradually from the inside of the hot sealing wheel by configuring the heating sheet inside the hot sealing wheel, preventing the heating sheet from being exposed directly, decreasing heat exchange with the outside environment, and ensuring the temperature uniformity of the circumferential surface of the outer side of the hot sealing wheel;

3. temperature fluctuation due to environment is small; heat is transmitted outward gradually from the inside of the hot sealing wheel by configuring the heating sheet inside the hot sealing wheel, preventing the heating sheet from being exposed directly such that the temperature fluctuation of the heating sheet due to environment is small;

4. hot sealing stability is high; in the structural design, the carbon brush is configured on the end of the conductive spring in such a way that the conductive spring is subject to heat to extend while the heating sheet is heated, and thus to cause the carbon brush to be in conduction with the electrode plate to rotate the transmission wheel, and then to drive the hot sealing wheel to rotate, allowing the contact of film roll with the rotating hot sealing wheel to realize hot sealing, and the sliding friction and thermal adhesion are not easy to be generated, thereby improving the hot sealing stability effectively; and 5. the cost is low; all components of the heating apparatus are assembled into a whole through engagement in such a way to simplify the structural design in the premise of ensuring the heat transfer effect, thereby improving the quickness of the assembly and forming, and the convenience of the daily maintenance and treatment.

DETAILED DESCRIPTION OF THE PREFERRED EMBODIMENTS

Figure 1:
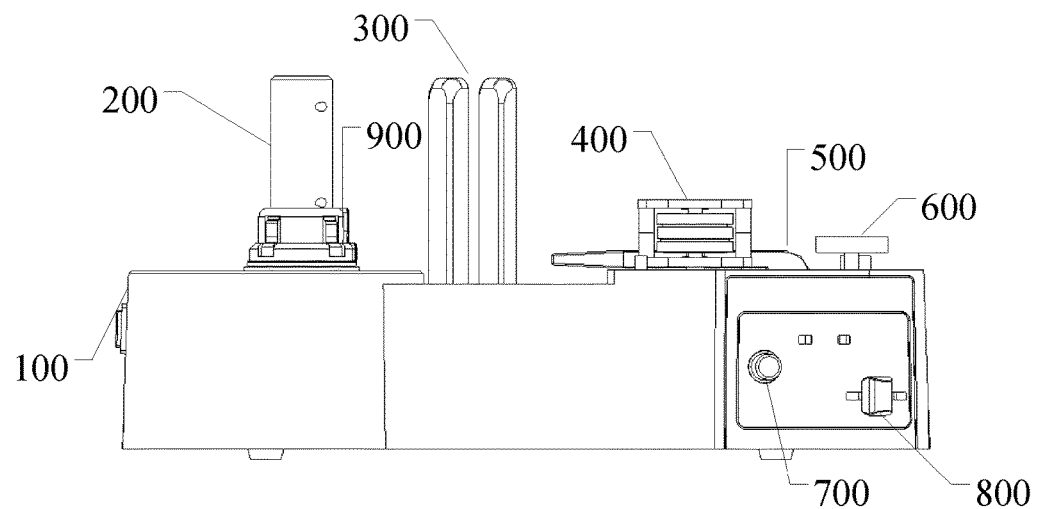
FIG. 1 is a schematic view of the whole structure of an air cushion machine.
Figure 2:
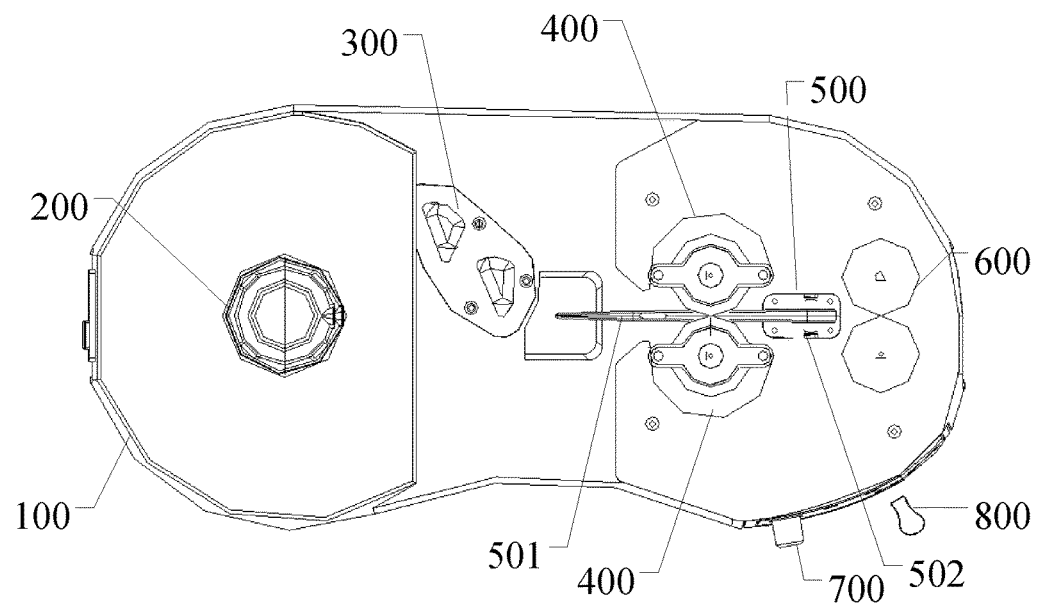
FIG. 2 is a top view of the whole structure of an air cushion machine.

Referring to FIGS. 1 and 2, an air cushion machine includes a table 100, on which a bag film scroll 200, film guide 300, blower 500, heating apparatus 400 and traction device 600 are configured, where the film scroll 200 and the traction device 600 are respectively configured on the two ends of the table 100; the film guide 300 and heating apparatus 400 between the film scroll 200 and traction device 600; the blower 500 between the components of the heating apparatus 400. The bag film scroll 200 is used for the placement of plastic film to be hot-sealed, and the blower 500 filling air into bag film before hot sealing. When the machine is turned on, the bag film on the bag film scroll is dragged by the traction device 600 and guided by the film guide 300 to enter the heating apparatus 400, at where the bag film is hot-sealed while air is blown into it with the blower 500, ensuring that the bag film can be hot-sealed uniformly. In order to achieve more effective hot sealing, on the table 100 is configured with an air volume regulator 700 and on-off switch 800 configured below the heating apparatus 400, where the air volume regulator 700 is adapted to adjust air volume for the blower 500, and on-off switch turn on and off the heating apparatus 400. The blower 500 includes a guide air tap 501 adapted to insert inside the bag film, the two sides of the bottom of which are respectively equipped with a cutting knife 502 adapted to cut the edge of a hot-sealed air cushion after the bag film is hot-sealed.

Figure 3:
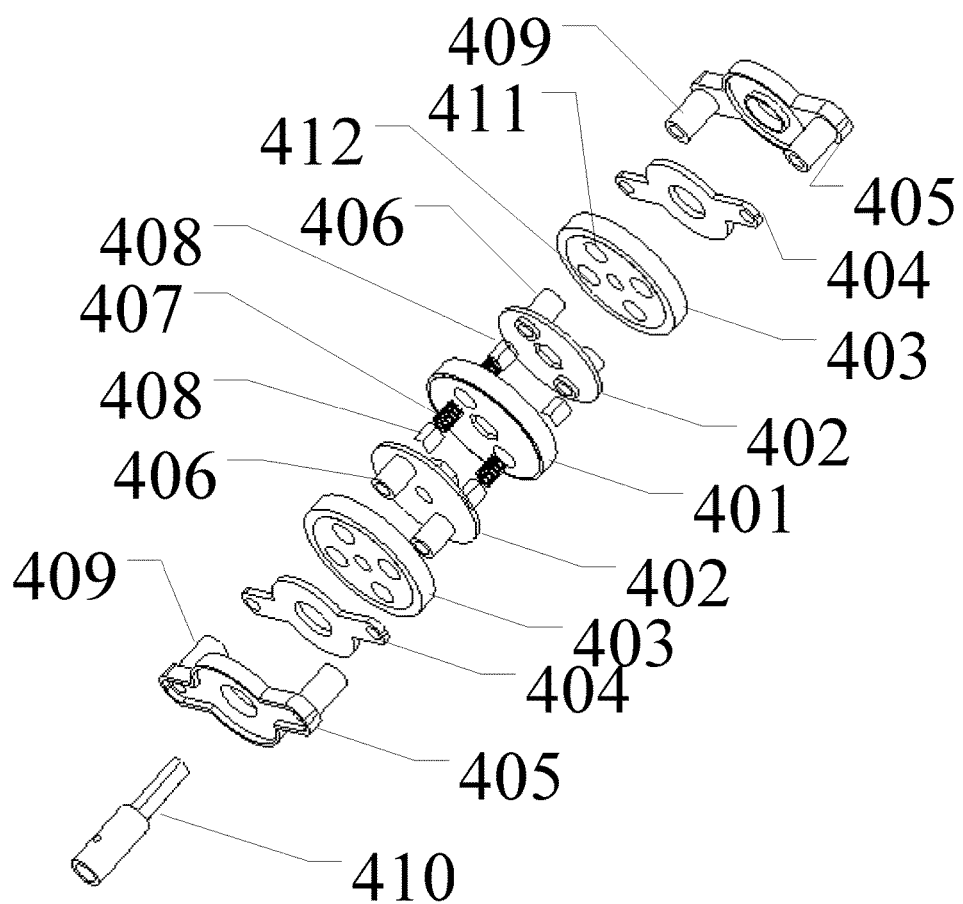
FIG. 3 is an explode view of a heating apparatus for an air cushion machine according to the present invention.
Figure 4:
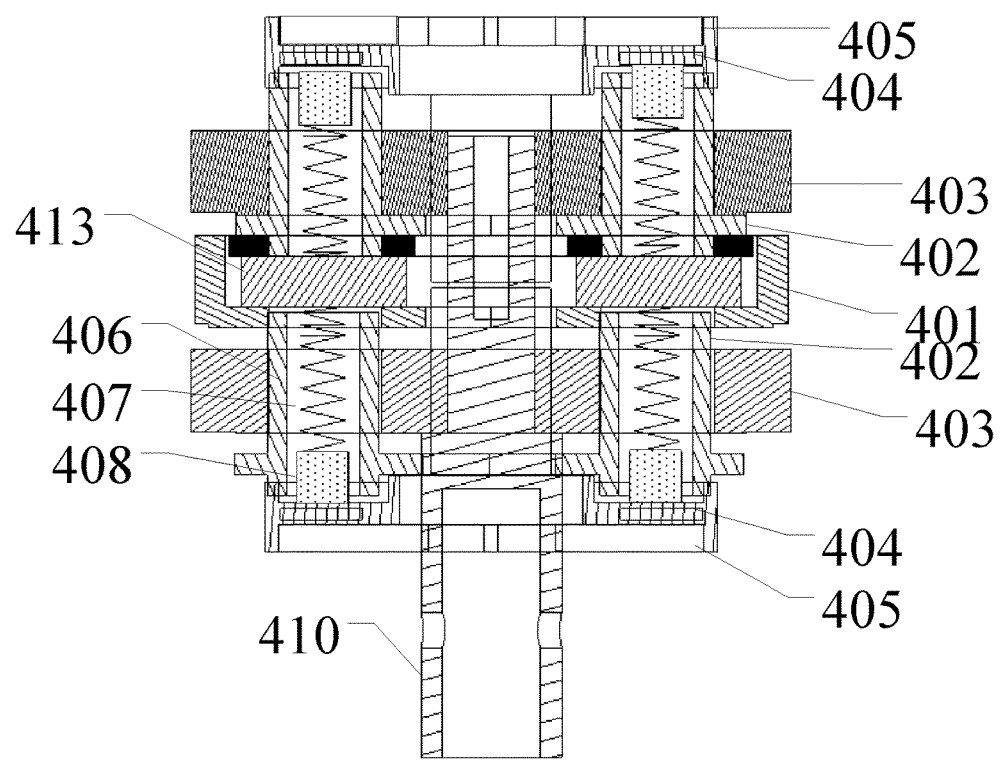
FIG. 4 is a cross-sectional view of the heating apparatus for an air cushion machine according to the present invention.
Figure 5:
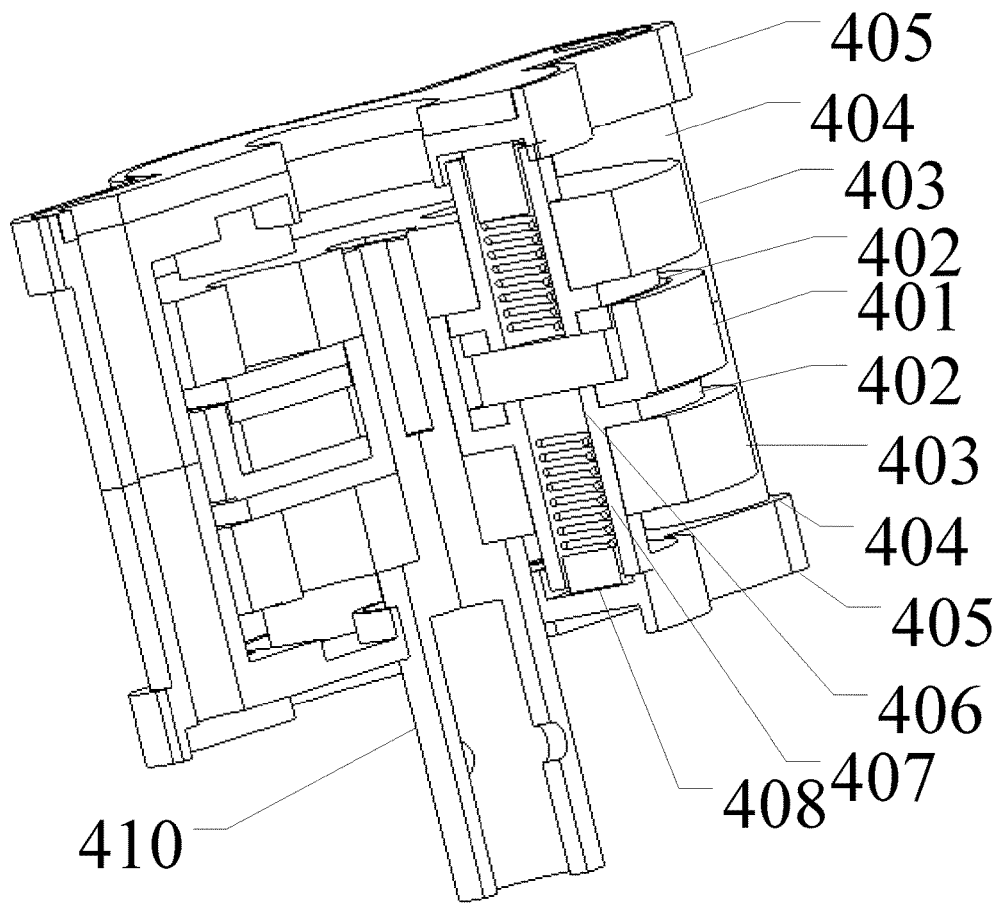
FIG. 5 is a schematic view of the internal structure of the heating apparatus for an air cushion machine according to the present invention.

Referring to FIGS. 3 to 5, the heating apparatus 400 includes a hot sealing wheel 401; a transmission wheel 403 is respectively configured on the two sides of the hot sealing wheel 401; an electrode plate 404 is configured on the outer side of each the transmission wheel 403; a guide cylinder seat 402 is configured between the transmission wheel 403 and hot sealing wheel 401, fixing guide cylinders 406 are projected from the guide cylinder seat 402; the guide cylinders are passed through the transmission wheel 403 to be in contact with the electrode plate 404; heating sheets 413 is configured inside the hot sealing wheel 401; the surface of the heating sheet 413 is in electric connection with a conductive spring 407; another end of the conductive spring 407 is configured with a carbon brush 408 in rotational contact with the electrode plate 401; the conductive spring 407 and carbon brush 408 are inserted inside the fixing guide cylinder 406; the electrode plate 404 is configured on the outer side of the transmission wheel 403 through an electrode plate fixing bracket 405; the electrode plate fixing bracket 405 is configured on the outer side of the electrode plate 404; the electrode plate fixing bracket 405 includes two fixing projecting cylinders 409, which are respectively passed through the electrode plate 404, transmission wheel 403, hot sealing wheel 401 to engage them into one body actively. Furthermore, the circumferential surfaces of the hot-sealing wheel 401 and transmission wheel 403 are respectively covered with a layer of silicone; the heating sheet 413 is an annular body and a PTC heating sheet. Furthermore, the fixing guide cylinders 406 number two and projected symmetrically from the outer side of the guide cylinder seat 402. Furthermore, the transmission wheel 403 is configured with guide cylinder fixing through holes 411 and projecting cylinder fixing through holes 412, which are staggered symmetrically; the heating apparatus 400 is configured on the air cushion machine through a rotating shaft 410, the rotating shaft 410 being passed through the centers of the electrode plate fixing brackets 405, electrode plates, transmission wheels 403 and hot sealing wheel 401 simultaneously.

Referring to FIGS. 1 and 2 again, the heating apparatuses 400 configured on the air cushion machine number two, and the two heating apparatus 400 are opposed to each other.

I claim:

1. A heating apparatus for an air cushion machine, comprising a hot sealing wheel, wherein two transmission wheels are each configured on a respective side of said hot sealing wheel, two electrode plates are each configured on an outer side of each of said transmission wheels, two guide cylinder seats are each configured between each of said transmission wheels and said hot sealing wheel, a plurality of fixing guide cylinders are projected from each of said guide cylinder seats, said fixing guide cylinders are passed through said transmission wheels to be in electric contact with a respective one of said electrode plates, a heating sheet is configured inside said hot sealing wheel, each lateral surface of said heating sheet is in electric connection with an end of a conductive spring, another end of each of said conductive springs is configured with a carbon brush in rotational contact with a respective one of said electrode plates, and said conductive springs and said carbon brushes are configured inside each of said fixing guide cylinders.

2. The heating apparatus according to claim 1, wherein a layer of silicone is covered on a circumferential surface of said hot sealing wheel.

3. The heating apparatus according to claim 2, wherein said heating sheet is an annular body.

4. The heating apparatus according to claim 3, wherein said heating sheet is a PTC heating element.

5. The heating apparatus according to claim 4, wherein each of said electrode plates is configured on an outer side of each of said transmission wheels through an electrode plate fixing bracket, said electrode plate fixing bracket is configured on an outer side of each of said electrode plates, said electrode plate fixing bracket comprises two fixing projecting cylinders respectively passed through each of said electrode plates, each of said transmission wheels and said hot sealing wheel to engage therewith actively.

6. The heating apparatus according to claim 5, wherein said fixing guide cylinders number two, said two fixing guide cylinders are projected symmetrically from an outer side of each of said guide cylinder seats.

7. The heating apparatus according to claim 6, wherein each of said transmission wheels is configured with guide cylinder fixing through holes and projecting cylinder fixing through holes staggered symmetrically.

8. The heating apparatus according to claim 7, wherein said heating apparatus is configured on said air cushion machine through a rotating shaft, and said rotating shaft is passed through centers of said electrode plate fixing brackets, said electrode plates, said transmission wheels and said hot sealing wheel.

9. The heating apparatus according to claim 8, wherein said air cushion machine further comprises a second heating apparatus, and both heating apparatuses are opposed to each other.

10. The heating apparatus according to claim 1, wherein a layer of silicone is covered on a circumferential surface of each of said transmission wheels.

11. The heating apparatus according to claim 10, wherein said heating sheet is an annular body.

12. The heating apparatus according to claim 11, wherein said heating sheet is a PTC heating element.

13. The heating apparatus according to claim 12, wherein each of said electrode plates is configured on an outer side of each of said transmission wheels through an electrode plate fixing bracket, said electrode plate fixing bracket is configured on an outer side of each of said electrode plates, said electrode plate fixing bracket comprises two fixing projecting cylinders respectively passed through each of said electrode plates, each of said transmission wheels and said hot sealing wheel to engage therewith actively.

14. The heating apparatus according to claim 13, wherein said fixing guide cylinders number two, said two fixing guide cylinders are projected symmetrically from an outer side of each of said guide cylinder seats.

15. The heating apparatus according to claim 14, wherein each of said transmission wheels is configured with guide cylinder fixing through holes and projecting cylinder fixing through holes staggered symmetrically.

16. The heating apparatus according to claim 15, wherein said heating apparatus is configured on said air cushion machine through a rotating shaft, and said rotating shaft is passed through centers of said electrode plate fixing brackets, said electrode plates, said transmission wheels and said hot sealing wheel.

17. The heating apparatus according to claim 16, wherein said air cushion machine comprises a second heating apparatus, and both heating apparatuses are opposed to each other.

* * * * *